Nov. 13, 1962 R. W. REACH, JR., ETAL 3,064,140
CURRENT REGULATING CIRCUIT FOR SWITCHING
MEMORY ELEMENTS AND THE LIKE
Filed July 29, 1957

INVENTOR.
ROY W. REACH, JR.
NORMAN M. LOURIE
ELMER T. JOHNSON
BY
Henry L. Hanson
ATTORNEY 3,064,140
Patented Nov. 13, 1962

3,064,140

CURRENT REGULATING CIRCUIT FOR SWITCHING MEMORY ELEMENTS AND THE LIKE

Roy W. Reach, Jr., Sudbury, Elmer T. Johnson, Wayland, and Norman M. Lourie, Newton Highlands, Mass., assignors, by mesne assignments, to Minneapolis-Honeywell Regulator Company, a corporation of Delaware Filed July 29, 1957, Ser. No. 674,905
13 Claims. (Cl. 307—88.5)

Figures 1, 2:
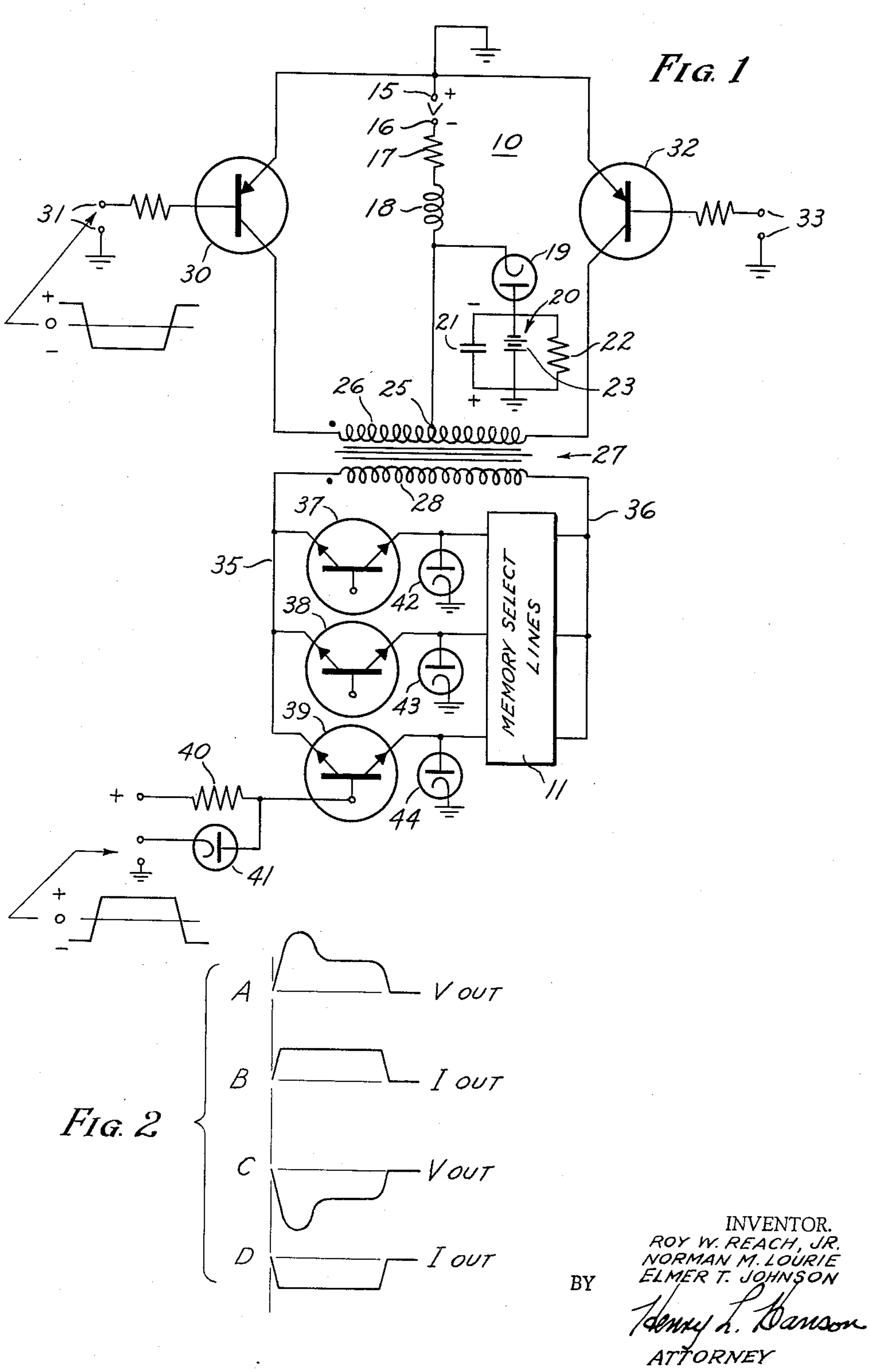

A general object of the present invention is to provide a new and improved apparatus for generating electrical signal pulses. More specifically, the present invention is concerned with an apparatus for producing a signal pulse where the signal pulse is characterized by its having a constant current and by its being readily formed as a pulse of a reversible polarity.

The generation of pulses is frequently required for signaling circuits, switching circuits, and the like. The pulses required may be of plus or minus polatriay depending upon the use to which the resultant signal is to be placed. Certain types of circuits require that the pulses used be of the constant current type, that is each pulse throughout its duration should have a constant current amplitude. A representative device requiring a constant current pulse is the coincident current memory which is widely used in digital data precessing equipment. This coincident current memory utilizes bistable magnetic cores which are adapted to be switched between one or the other of its two stable states by current pulses applied to wries which thread the cores. The most effective switching current for these devices is a current having a constant amplitude. A more extensive discussion of coincident current memory devices will be found in an article by J. W. Forrester entitled, "Digital Information Storage in Three Dimensions Using Magnetic Cores," in the Journal of Applied Physics, January 1951, page 44.

It is desirable that the circuitry generating the constant current pulses be stable and that the pulses generated have an amplitude which is independent of the characteristics of any of the active elements in the circuit. Thus, if an electronic amplifier or switching device is used in the pulse generating circuit, the resultant output signal should have an amplitude which is independent of the internal characteristics of the electronic amplifier or switching device.

It is accordingly another more specific obejct of the present invention to provide a new and improved pulse generating circuit which poduces an output pulse whose current amplitude is independent of the characteristics of the active elements of the circuit.

The foregoing object of the invention is achieved by a novel arrangement of a source of power which is connected to normally supply a constant current to a current sink. When an output pulse is desired, the current to the current sink is momentarily diverted to a load circuit and is then returned to the current sink. The diversion may be effected by an electronic switch which is adapted to be switched from a high impedance state where substantially no current will flow to a low impedance state where the current may flow with substantially no effect thereon by the impedance of the switch. By operating an electronic switch only in its high impedance and low impedance states, it is possible to minimize the effect of changes in the electronic switch due to aging, ambient conditions and the like.

It is accordingly another object of the invention to provide a constant current pulse generating circuit which comprises a constant current sink in combination with an electronic switching device which is adapted to divert the current flow from the sink into a load device for the duration of the pulse generated.

In order to produce a pulse whose output polarity is plus or minus, the present invention has utilized a transformer in combination with a pair of electronic switches which are adapted to divert the current flow in one direction or the other through the transformer so that the signal on the output windings thereof will be of a polarity dependent upon the direction of the current flow in the input winding.

It is then a still further object of the present invention to provide a circuit for generating signal pulses of one polarity or the other, where the signal pulses are of constant amplitude, by means of a pair of switching circuits co-operating with a current source where the switch circuits are adapted to selectively pass the desired current in one direction or the other through an appropriate load device.

It has been found that a very effective electronic switch exists in the semi-conductor amplifiers commonly known as transistors. These transistors generally incorporate emitter and collector electrodes which form a connection to the semi-conductor material where the impedance of the semi-conductor material may be appropriately regulated by the control or base electorde. When the transistor device is biased to its nonconducting region, it has a relatively high internal impedance. When biased to the saturated condition in the conduction region, the impedance is relatively low.

A still further more specific object of the invention is, therefore, to provide a constant current pulse generating circuit utilizing transistor devices as the active switching elements of the circuit and where these transistor devices may be operated without their internal impedance characteristics having an appreciable effect on the resultant output pulse.

The foregoing objects and features of novelty which characterize the invention as well as other objects of the invention are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Of the drawings:

FIGURE 1 illustrates a preferred embodiment of the circuit of the present invention; and FIGURE 2 shows representative wave forms produced by the circuitry of FIGURE 1.

Referring first to FIGURE 1, the numeral 10 identifies the switching circuit used to produce the current pulse which is desired for application to a utilization circuit 11, the latter of which may take the form of a coincident current memory of the type disclosed in the aforementioned article by J. W. Forrester. The switching circuit or pulse generating circuit 10 will be seen to comprise a pair of terminals 15 and 16 which are adapted to be connected to a suitable source of power having a substantially constant voltage output. Connected to the power source terminals 15 and 16 is a first series circuit which comprises a resistor 17, inductor 18, a diode 19 and a current sink 20. The current sink 20 comprises a condenser 21 and a resistor 22, and a power supply 23. The latter is particularly desirable when the apparatus is used with a high duty cycle.

Connected to the junction of the inductor 18 and diode 19 is a center tap 25 of a transformer winding 26. The transformer winding 26 serves as the primary winding for a transformer 27, the latter having a secondary or output winding 28. Connected between the left end terminal of the primary winding 26 and the power supply terminal 15 is a switching device comprising a transistor 30. The transistor 30 includes the normal emitter, collector and base electrodes. A pair of input terminals 31 are connected to the input of the transistor 30 for purposes of switching the transistor 30 between its high impedance state and low impedance state as will be more fully explained below.

Connected between the right end of the primary winding 26 and the power supply terminal 15 is a further transistor switching device 32, the latter having the normal base, emitter and collector electrodes. Connected to the input of the transistor 32 are a pair of input terminals 33 on which a control signal is adapted to be applied for switching the transistor 32 between its high impedance state and low impedance state.

Connected to the output secondary winding 28 are a pair of output lines 35 and 36. These lines 35 and 36 are adapted to have a current pulse from the secondary winding 28 applied thereto. Connected between the lines 35 and 36 are a plurality of address selection switching devices in the form of transistors 37, 38 and 39. These transistors are used to selectively apply the current pulse on the lines 35 and 36 to one of the select lines of the memory device 11. The particular select line activated will be dependent upon which one of the control transistors 37, 38 or 39 is activated by a control signal source, not shown. The transistors 37, 38 and 39 are symmetrically conducting transistors; i.e. they are capable of passing current equally well in either direction through the emitter-collector circuit. A transistor type suitable for use in this position is Sylvania GT 847. The input circuit illustrated for the transistor 39 is representative of those for the transistors 37 and 38. Thus, a bias source is coupled to the base electrode by way of a resistor 40. A switching signal may be applied to the base electrode by way of a diode 41.

A base current will be flowing in the symmetrical transistor that is selected for switching. To minimize the effects of base current in the selected select lines, a series of diodes 42, 43 and 44 are connected to the lines and to ground. Thus, when an input pulse is applied to the base of the transistor 39, the base current will flow through the diode 44 to ground when the select current from transformer secondary 28 flows through the transistor 39 from left to right. When the select current flows in the opposite direction, the base current will flow through the line 35, the winding 28, line 36 to the select lines leading to diodes 42 and 43. This distributes the base current to the other select lines to thereby minimize the amount of base current flowing in any one line in the memory circuit and eliminate the flow in the selected select line.

In considering the operation of the present invention, it is first assumed that there are no input signals on either of the input terminals 31 and 33 and that the transistors 30 and 32 are both biased into their high impedance state. Under these conditions, a current will be flowing from the source of power and this current may be traced from the positive supply terminal 15 through the ground terminal, the sink 20, diode 19, inductor 18 and resistor 17 back to the negative terminal 16. The current flowing in this circuit will be a constant current provided a constant voltage is applied thereto at the terminals 15 and 16. Since it is desired to produce an output pulse on the winding 28, the control signal will be applied to one or the other of the input terminals 31 or 33. When an input signal is applied to the terminals 31 to switch the transistor 30 from its high impedance state to its low impedance state, the current which was flowing through the diode 19 and the sink 20 will now be diverted therefrom and will pass through the emitter-collector circuit of the transistor 30, the left terminal of the primary 26, to the center tap 25 and thence through the inductor 18 and resistor 17 back to the negative terminal 16. The inductor 18 and the resistor 17 serve to maintain the current flow through the active section of the primary winding 26 substantially constant during the interval of the pulse produced. The output signal appearing on the lines 35 and 36 will take the form represented in FIGURE 2. The voltage signal will be as represented in FIGURE 2A. The current signal will take the form represented in FIGURE 2B and will be seen to comprise a wave having a constant amplitude throughout substantially its entire duration. The termination of the pulse is effected by switching the transistor 30 back to its high impedance state so that the current will be switched back through diode 19 and into the sink 20.

Should an output pulse of opposite polarity be desired, an input signal will be applied to the input terminals 33. Thus the transistor 32 will be switched from its high impedance state to its low impedance state. When the transistor 32 is switched to its low impedance state, the current will again be diverted from sink 20 and the diode 19 to the righthand portion of the primary winding 26. This time the current will be flowing from the primary winding in a direction opposite to that resulting from the current flow switched from the transistor 30. Thus the output signal will be of opposite polarity. The output voltage appearing in the lines 35 and 36 will be as represented in FIGURE 2C while the output current on the lines 35 and 36 will be as represented in FIGURE 2D. Again the current signal will be of constant amplitude throughout substantially all of its duration. The duration of the pulse will be determined by the time that the control signal is removed from the input terminals 33 so that the transistor 32 will be switched back to its high impedance state.

Since the transistors 30 and 32, when cut off, have a very high impedance the current flow through these devices will be substantially negligible and consequently there will be substantially no power dissipated in either of these switching devices. Conversely, when the transistor devices are switched to their low impedance state, the impedance again is sufficiently low that even though a relatively large current may be flowing through the device, the resultant power dissipation in the transistor is low. While power is dissipated during the switching operation, it is likewise low. As these transistor devices are not operated in the region between the high impedance and low impedance states for any appreciable time, the resultant current flow is substantially independent of any of the characteristics of these devices in their intermediate regions where they are most subject to variation due to ambient conditions and aging. Further, the use of transistors in this configuration permits the selection of relatively inexpensive transistors when the duty cycle requirements are not excessive.

It will be readily apparent that the techniques utilized in the present pulse producing circuit may be extended to other types of circuits wherein constant current pulses are required.

While, in accordance with the provisions of the statutes, there has been illustrated and described the best forms of the invention known, it will be apparent to those skilled in the art that changes may be made in the apparatus described without departing from the spirit of the invention as set forth in the appended claims and that in some cases, certain features of the invention may be used to advantage without a corresponding use of other features.

Having now described the invention, what is claimed as new and novel and which it is desired to secure by Letters Patent is:

1. Apparatus for producing a signal pulse having a constant current comprising a source of power, a first series circuit means providing a constant direct current path connected to said source of power, said first series circuit means comprising an inductor, a diode, and a parallel connected resistor and condenser, a second series circuit means comprising a switching device and a load circuit, means connecting one end of said second series circuit means to said source of power, and means connecting the other end of said second series circuit means to a point on said first series circuit means, said switching device when actuated being adapted to selectively switch the direct current flow through said inductor away from said diode and into said load circuit.

2. Apparatus as defined in claim 1 wherein said load circuit comprises a transformer whose primary winding is connected in series with said switching device and whose secondary circuit is connected to a device that utilizes the current.

3. Apparatus as defined in claim 2 wherein said switching device is a transistor having base, emitter, and collector electrodes, and means connecting said emitter and collector electrodes in series with said primary winding.

4. Apparatus for producing a signal pulse having a constant current comprising a source of power, a first direct current series circuit means providing a constant current path connected to said source of power, said first series circuit means comprising an inductor, a diode, and a parallel connected resistor and condenser and voltage source, a second direct current series circuit means comprising a transistor switching device and a load circuit, means connecting one end of said second series circuit means to said source of power, and means connecting the other end of said second series circuit means to a point on said first series circuit means between said inductor and said diode.

5. Apparatus for producing a signal pulse having a constant current comprising a source of power, a first direct current series circuit connected to said source of power, said first series circuit adapted to have a constant direct current flow therein and comprising an inductor, a resistor, a diode, and a parallel connected resistor and condenser, a second series circuit comprising an electronic switching device and a load circuit, means connecting one end of said second series circuit to said source of power, and a direct connection from the other end of said second series circuit to one end of said diode.

6. Apparatus for producing a constant current signal pulse of one polarity or of opposite polarity comprising a source of power, an inductor, a diode, a parallel circuit comprising a resistor, and condenser, means connecting said inductor, said diode, and said parallel circuit in series to said source of power, a transformer having a center tapped primary winding and a secondary winding, means connecting the center tap of said primary winding to said inductor, and a pair of switching means connecting the ends of said primary winding to a terminal on said source of power.

7. Apparatus for producing a constant current signal pulse of one polarity or of opposite polarity comprising a source of power, an inductor, a diode, a parallel circuit comprising a resistor, and condenser, means connecting said inductor, said diode, and said parallel circuit in series to said source of power, a transformer having a center tapped primary winding and a secondary winding, means connecting the center tap of said primary winding to said inductor, and a pair of transistor switching means connecting the ends of said primary winding to a terminal on said source of power, said transistors each having a control element adapted to be selectively activated to switch the impedance thereof between a relatively high value and a relatively low value.

8. Apparatus for producing a constant current signal pulse of one polarity or of opposite polarity comprising a source of power, an inductor, a diode, a parallel circuit comprising a resistor, and condenser, means connecting said inductor, said diode, and said parallel circuit in series to said source of power, a transformer having a center tapped primary winding and a secondary winding, means connecting the center tap of said primary winding to one terminal of said diode and said inductor, a pair of switching means connecting the ends of said primary winding to a terminal on said source of power, said switching means comprising a pair of transistors each having emitter and collector elements, and a base element, means connecting said emitter and collector elements in impedance switching position in said last named connection, and a signal source adapted to be selectively connected to said base elements.

9. Electrical pulse producing apparatus comprising a source of power, a direct current sink means connected to said source of power to provide a constant current path, a load circuit, current switching means, and means connecting said switching means in series with said load circuit to said source of power to selectively divert the current flow to said current sink means into said load circuit.

10. Electrical pulse producing apparatus comprising a source of power, a direct current sink means connected to said source of power to provide a constant current path, a load circuit, electronic current switching means comprising a transistor device, and means connecting said switching means in series with said load circuit to said source of power to selectively divert the current flow to said current sink means into said load circuit.

11. Electrical pulse producing apparatus comprising a source of power, a direct current sink means connected to said source of power to provide a constant current path, a diode connected in series with said sink means, a load circuit, current switching means, and means connecting said switching means in series with said load circuit to said source of power and to said diode to selectively divert the current flow to said current sink means into said load circuit.

12. Electrical pulse producing apparatus comprising a source of power, a direct current sink means connected to said source of power to provide a constant current path, a load circuit, a transformer having a primary winding and a secondary winding, said secondary winding being connected to said load circuit, current switching means, and means connecting said switching means in series with said primary winding to said source of power to selectively divert the current flow to said current sink means into said load circuit.

13. Electrical pulse producing apparatus comprising a source of power, a direct current sink means for providing a constant current path and comprising a parallel connected resistor, condenser, and direct current source of power, means connecting said current sink means to said source of power, a load circuit, current switching means, and means connecting said switching means in series with said load circuit to said source of power to selectively divert the direct current flow from said current sink means into said load circuit.

References Cited in the file of this patent

UNITED STATES PATENTS

| | | |
|---|---|---|
| 2,362,652 | Lundborg | Nov. 14, 1944 |
| 2,436,803 | Haug | Mar. 2, 1948 |
| 2,543,428 | Wendt et al. | Feb. 27, 1951 |
| 2,562,550 | Havens | July 31, 1951 |
| 2,768,367 | Rajchman | Oct. 23, 1956 |
| 2,776,419 | Rajchman | Jan. 1, 1957 |
| 2,889,537 | Elliott | June 2, 1959 |
| 2,898,479 | McElroy | Aug. 4, 1959 |
| 2,941,125 | Lippincott | June 14, 1960 |